United States Patent
Gadiraju et al.

(10) Patent No.: US 10,742,149 B1
(45) Date of Patent: Aug. 11, 2020

(54) SYSTEM AND METHOD FOR REACTIVE POWER CONTROL OF A WIND TURBINE BY VARYING SWITCHING FREQUENCY OF ROTOR SIDE CONVERTER

(71) Applicant: General Electric Company, Schenectady, NY (US)

(72) Inventors: Kasi Viswanadha Raju Gadiraju, Bangalore (IN); Olive Ray, Kolkata (IN); Kapil Jha, Bangalore (IN); Yashomani Yashodhan Kolhatkar, Bangalore (IN)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 16/390,547

(22) Filed: Apr. 22, 2019

(51) Int. Cl.
| | |
|---|---|
| *H02P 9/42* | (2006.01) |
| *H02P 9/00* | (2006.01) |
| *H02P 9/10* | (2006.01) |
| *H02P 9/30* | (2006.01) |
| *H02P 101/15* | (2016.01) |
| *H02M 5/458* | (2006.01) |

(Continued)

(52) U.S. Cl.
CPC .............. *H02P 9/42* (2013.01); *F03D 9/255* (2017.02); *H02J 3/1842* (2013.01); *H02J 3/386* (2013.01); *H02M 1/42* (2013.01); *H02M 5/4585* (2013.01); *H02P 9/007* (2013.01); *H02P 9/105* (2013.01); *H02P 9/30* (2013.01); *F05B 2220/706* (2013.01); *F05B 2270/327* (2013.01); *F05B 2270/402* (2013.01); *H02P 2101/15* (2015.01)

(58) Field of Classification Search
CPC ........................................................ H02P 9/42

USPC .................................... 290/44, 55; 702/130
See application file for complete search history.

(56) References Cited

U.S. PATENT DOCUMENTS

| | | | |
|---|---|---|---|
| 904,607 A | 11/1908 | Elmblad | |
| 6,566,764 B2 * | 5/2003 | Rebsdorf | ............... H02P 9/007 |
| | | | 290/44 |

(Continued)

FOREIGN PATENT DOCUMENTS

| | | |
|---|---|---|
| CN | 201167296 Y | 12/2008 |
| WO | WO2011161692 A2 | 12/2011 |
| WO | WO2014/044007 A1 | 3/2014 |

OTHER PUBLICATIONS

Lei et al., Modeling of the Wind Turbine With a Doubly Fed Induction Generator for Grid Integration Studies, IEEE Transactions on Energy Conversion, vol. 21, Issue 1, Mar. 2006, pp. 257-264.

(Continued)

*Primary Examiner* — Pedro J Cuevas
(74) *Attorney, Agent, or Firm* — Dority & Manning, P.A.

(57) ABSTRACT

A method and associated system for operating a power generation system to provide real and reactive power to a load includes, with a power converter having switching elements, receiving power from a generator and generating the reactive power within an operating range of generator rotor speed. As the generator rotor speed changes and approaches synchronous speed, a control command is generated to decrease a switching frequency of the switching elements in the power converter from a first switching frequency to a second switching frequency, wherein the reactive power output of the power converter is maintained or increased at the second switching frequency.

20 Claims, 5 Drawing Sheets

(51) Int. Cl.
*H02M 1/42* (2007.01)
*H02J 3/18* (2006.01)
*F03D 9/25* (2016.01)
*H02J 3/38* (2006.01)

(56) References Cited

U.S. PATENT DOCUMENTS

| | | | | |
|---|---|---|---|---|
| 6,856,038 | B2* | 2/2005 | Rebsdorf | H02P 9/007 |
| | | | | 290/44 |
| 6,924,565 | B2 | 8/2005 | Wilkins et al. | |
| 7,013,203 | B2 | 3/2006 | Moore et al. | |
| 7,071,579 | B2 | 7/2006 | Erdman et al. | |
| 7,095,597 | B1 | 8/2006 | Cousineau | |
| 7,166,928 | B2 | 1/2007 | Larsen | |
| 7,245,037 | B2 | 7/2007 | Angquist et al. | |
| 7,411,309 | B2 | 8/2008 | Hudson | |
| 7,567,160 | B2 | 7/2009 | Folts et al. | |
| 7,622,815 | B2* | 11/2009 | Rivas | H02P 9/102 |
| | | | | 290/44 |
| 7,847,526 | B2* | 12/2010 | Tan | H02P 21/22 |
| | | | | 322/46 |
| 7,923,862 | B2 | 4/2011 | Cardinal et al. | |
| 7,982,326 | B2* | 7/2011 | Tan | H02P 29/50 |
| | | | | 290/44 |
| 8,046,109 | B2 | 10/2011 | Larsen et al. | |
| 8,148,929 | B2 | 4/2012 | Wei et al. | |
| 8,242,735 | B2* | 8/2012 | Hein | H02P 29/68 |
| | | | | 318/798 |
| 8,432,052 | B2 | 4/2013 | Lu et al. | |
| 8,471,516 | B2 | 6/2013 | Wei et al. | |
| 8,487,461 | B2* | 7/2013 | Engelhardt | H02M 1/08 |
| | | | | 290/44 |
| 8,653,685 | B2 | 2/2014 | Garcia | |
| 8,664,800 | B2 | 3/2014 | Galbraith et al. | |
| 8,736,091 | B2* | 5/2014 | Wei | H02M 1/32 |
| | | | | 290/44 |
| 8,847,562 | B2 | 9/2014 | Agudo Araque | |
| 8,853,876 | B1 | 10/2014 | Wagoner et al. | |
| 8,860,213 | B2* | 10/2014 | Kominami | H01L 23/36 |
| | | | | 257/722 |
| 9,083,260 | B2 | 7/2015 | James | |
| 9,214,883 | B2 | 12/2015 | Kim et al. | |
| 9,236,742 | B2 | 1/2016 | Garcia | |
| 9,366,233 | B2 | 6/2016 | Bech et al. | |
| 9,407,186 | B2 | 8/2016 | Babazadeh et al. | |
| 9,419,439 | B2 | 8/2016 | Nielsen | |
| 9,556,852 | B2 | 1/2017 | Babazadeh et al. | |
| 9,556,853 | B2 | 1/2017 | Gupta et al. | |
| 9,625,921 | B2 | 4/2017 | Smith et al. | |
| 9,660,448 | B2 | 5/2017 | Ellena et al. | |
| 9,903,765 | B2* | 2/2018 | Daitoku | G01K 7/01 |
| 9,998,030 | B2* | 6/2018 | Wei | H02M 1/32 |
| 10,103,663 | B1* | 10/2018 | Wagoner | H02P 9/007 |
| 10,107,260 | B2 | 10/2018 | Ritter et al. | |
| 10,496,052 | B2* | 12/2019 | Fu | H02P 21/14 |
| 2002/0079706 | A1* | 6/2002 | Rebsdorf | H02P 9/007 |
| | | | | 290/55 |
| 2004/0026929 | A1* | 2/2004 | Rebsdorf | H02P 9/007 |
| | | | | 290/44 |
| 2004/0124808 | A1* | 7/2004 | Hirono | H02M 1/32 |
| | | | | 318/806 |
| 2005/0197799 | A1* | 9/2005 | Kamezawa | G01K 7/22 |
| | | | | 702/130 |
| 2007/0073510 | A1* | 3/2007 | Kerkman | G01K 7/425 |
| | | | | 702/130 |
| 2008/0157529 | A1* | 7/2008 | Rivas | H02P 9/007 |
| | | | | 290/44 |
| 2008/0262750 | A1* | 10/2008 | Ibori | H02M 5/451 |
| | | | | 702/34 |
| 2009/0085354 | A1* | 4/2009 | Tan | H02P 6/183 |
| | | | | 290/44 |
| 2010/0007300 | A1* | 1/2010 | Hein | H02P 29/68 |
| | | | | 318/503 |
| 2011/0002358 | A1* | 1/2011 | Sato | G01K 1/026 |
| | | | | 374/163 |
| 2011/0018281 | A1* | 1/2011 | Tan | H02P 6/183 |
| | | | | 290/55 |
| 2011/0140430 | A1* | 6/2011 | Ritter | H02M 5/458 |
| | | | | 290/44 |
| 2011/0295437 | A1* | 12/2011 | Lu | H02P 9/105 |
| | | | | 700/287 |
| 2013/0147407 | A1* | 6/2013 | Kawamura | H03K 17/0828 |
| | | | | 318/400.21 |
| 2013/0322487 | A1* | 12/2013 | Watanabe | G01K 7/02 |
| | | | | 374/4 |
| 2014/0042611 | A1* | 2/2014 | Kominami | H01L 23/36 |
| | | | | 257/713 |
| 2014/0175887 | A1 | 6/2014 | Shao et al. | |
| 2014/0361538 | A1* | 12/2014 | Wagoner | H02P 3/22 |
| | | | | 290/44 |
| 2015/0138852 | A1* | 5/2015 | Siemaszko | H02M 1/32 |
| | | | | 363/50 |
| 2015/0204730 | A1* | 7/2015 | Daitoku | G01K 1/026 |
| | | | | 374/178 |
| 2016/0268940 | A1 | 9/2016 | Achilles et al. | |
| 2017/0025858 | A1 | 1/2017 | Garcia et al. | |
| 2018/0302010 | A1* | 10/2018 | Wagoner | H02P 9/007 |
| 2019/0203693 | A1* | 7/2019 | Tiwari | F03D 17/00 |
| 2019/0280640 | A1* | 9/2019 | Ganireddy | H02J 3/386 |
| 2020/0059176 | A1* | 2/2020 | Ganireddy | H02P 9/008 |
| 2020/0067437 | A1* | 2/2020 | Wagoner | H02P 9/007 |

OTHER PUBLICATIONS

Jin et al., Pan Boolean PI Control of Grid-Tied Two-Level Inverter for Wind Power Generation, 2014 IEEE Workshop on Advanced Research and Technology in Industry Applications (WARTIA), 2014, pp. 427-430.

Bhukya et al., The controlling of the DFIG based on variable speed wind turbine modeling and simulation, Power Systems (ICPS), 2016 IEEE 6th International Conference, IEEE Explore, 6 Pages.

Sujod et al., Improving the Reactive Power Capability of the DFIG-Based Wind Turbine During Operation Around the Synchronous Speed, IEEE Transactions on Energy Conversion, vol. 28, No. 3, Sep. 2013, pp. 736-745.

* cited by examiner

| Speed (rpm) | RSC switching frequency (% of base value at normal speed) | | |
|---|---|---|---|
| 1140-1170 | 90% | 85% | 80% |
| 1170-1190 | 85% | 80% | 75% |
| 1190-1210 | 80% | 75% | 70% |
| 1210-1230 | 85% | 85% | 75% |
| 1230-1260 | 90% | 80% | 80% |
| Reactive power (Vars) | 2200 kVar | 2250 kVar | 2300 kVar |

FIG. -5-

SYSTEM AND METHOD FOR REACTIVE POWER CONTROL OF A WIND TURBINE BY VARYING SWITCHING FREQUENCY OF ROTOR SIDE CONVERTER

FIELD

The present disclosure relates generally to wind turbines and, more particularly, to a system and method to enhance reactive power capability of the wind turbine by controlling the switching frequency of the rotor-side converter (RSC) in a doubly-fed induction generator (DFIG) system.

BACKGROUND

Generally, during operation of a wind turbine, wind impacts the rotor blades and the blades transform wind energy into a mechanical rotational torque that drives a low-speed shaft. The low-speed shaft drives a gearbox that subsequently steps up the low rotational speed of the low-speed shaft to drive a high-speed shaft at an increased rotational speed, wherein the high-speed shaft rotatably drives a generator rotor. In many conventional wind turbine configurations, the generator is electrically coupled to a bi-directional power converter that includes a rotor-side converter (RSC) joined to a line-side converter (LSC) via a regulated DC link. Each of the RSC and the LSC typically includes a bank of pulse width modulated switching devices, for example insulated gate bipolar transistors (IGBT modules). The LSC converts the DC power on the DC link into AC output power that is combined with the power from the generator stator to provide multi-phase power having a frequency maintained substantially at the frequency of the electrical grid bus (e.g. 50 HZ or 60 HZ).

The above system is generally referred to as a doubly-fed induction generator (DFIG) system, whose operating principles include that the rotor windings are connected to the grid via slip rings and the power converter controls rotor current and voltage. Control of rotor voltage and current enables the generator to remain synchronized with the grid frequency while the wind turbine speed varies (e.g., rotor frequency can differ from the grid frequency). Also, the primary source of reactive power from the DFIG system is from the RSC via the generator (generator stator-side reactive power) and the LSC (generator line-side reactive power). Use of the power converter, in particular the RSC, to control the rotor current/voltage makes it is possible to adjust the reactive power (and real power) fed to the grid from the RSC independently of the rotational speed of the generator. In addition, the generator is able to import or export reactive power, which allows the system to support the grid during extreme voltage fluctuations on the grid.

Typically, the amount of reactive power to be supplied by a wind farm to the grid during steady-state and transient conditions is established by a code requirement dictated by the grid operator, wherein a wind farm controller determines the reactive power demand made on each wind turbine within the wind farm. A local controller at each wind turbine receives and allocates the reactive power demand between the generator sources (e.g., between generator-side reactive power and line-side reactive power).

As the generator speed approaches synchronous speed, the rotor fundamental frequency approaches DC where the thermal cycling of the IGBTs is greatest, resulting in a peak temperature of the rotor side IGBT at or near the synchronous speed. This results in a reduction of the total output current capability of the RSC, and thus a reduction in the reactive power capability of the RSC. Typically, the switching frequency on the rotor side of a DFIG power convertor is maintained at an elevated frequency (e.g., about 2000 or 3000 Hz) for all rotor speeds. While this elevated switching frequency is desirable for most operating speeds, at or near synchronous generator rotor speeds, it generates peak temperatures and thermal cycling stresses in the IGBTs and limits the reactive power capability of the DFIG system.

In addition, operation of a DFIG generator at or near synchronous speed is even more complicated because current harmonics are feed through the generator from the rotor side to the stator side and then directly to the transmission utility grid. These harmonics must be controlled to levels dictated by utility grid harmonic requirements.

U.S. Pat. No. 8,853,876 describes a system and method for operating a DFIG power generation system in a wind turbine. A control command is generated to control a switching frequency of the switching elements in the power converter to an adjusted switching frequency that is substantially equal to a fundamental frequency of the load when the generator is at or near synchronous speed. By reducing the switching frequency with reductions in the generator speed, power losses in the switching elements may be reduced. With such a reduction in power loss, the temperature rise in the switching elements may also be reduced, which may provide an extra margin in the output current capability of the power convertor and may also increase the component life of the switching elements. In addition, by closely matching the switching frequency with the fundamental frequency of the grid, a reduction in the amount of harmonics fed through to the line side of the converter may also be obtained, thereby decreasing the harmonic distortion to the grid.

U.S. Pat. No. 9,625,921 describes a method for temperature regulation of IGBTs in a power converter to reduce thermal stresses and extend the life of the devices. When the IGBTs are not within a predetermined temperature range, the switching frequencies of the devices are modified to bring the IGBTS within the temperature range.

A system and method that operate a power converter in a power generation system, such as a wind turbine DFIG system, in a manner to enhance the reactive power generation capability of the system in real time while maintaining harmonic distortions within limits would be desirable in the industry.

BRIEF DESCRIPTION

Aspects and advantages of the invention will be set forth in part in the following description, or may be obvious from the description, or may be learned through practice of the invention.

In one aspect, the present disclosure is directed to a method for operating a power generation system that supplies real and reactive power to a load. A power converter in the system includes switching elements and receives alternating current power generated by a generator, the power converter generating the reactive power within an operating range of generator rotor speed. As the generator rotor speed changes and approaches synchronous speed, a control command is generated to decrease a switching frequency of the switching elements in the power converter from a first switching frequency to a second switching frequency, wherein the reactive power output of the power converter is increased at the second switching frequency. The second switching frequency is determined in real operating time of the generator and is based on providing a defined reactive power value generated by the power converter at a changed generator rotor speed, such as a speed at or near synchronous speed, while maintain the switching elements within defined thermal limits.

The second switching frequency may also be based on maintaining total harmonic distortion (THD) of the system within defined limits, which may be limits dictated by the grid operator, by minimizing harmonic distortions induced by the power converter and transferred to the load.

In a certain embodiment of the method, the power converter comprises a line-side converter (LSC) and a rotor-side converter (RSC), where the RSC generates the reactive power.

In a particular embodiment, the generator (with LSC and RSC) may be a doubly fed induction generator (DFIG) in a wind turbine power generation system.

In one embodiment, the switching elements may be insulated gate bipolar transistor (IGBT) elements.

In a particular embodiment, a controller determines the second switching frequency from a look-up table that cross-references reactive power values generated at the second switching frequency for different generator rotor speeds. The look-up table may provide the different generator rotor speeds as a plurality of sub-ranges, wherein for each sub-range a second switching frequency is provided for a particular reactive power value. The look-up table may provide a plurality of different reactive power values and corresponding second switching frequencies for each sub-range of generator rotor speeds.

In one embodiment, the reactive power value required from the power generation system at a particular generator rotor speed is pre-defined (e.g., based on known characteristics of the power generation system and known load requirements) and entered into the look-up table to determine the second switching frequency.

In an alternate embodiment, the reactive power value required from the power generation system at a particular generator rotor speed is computed or otherwise determined in real time (e.g., by measuring the load reactive power or the reactive power supplied by the power generation system at a normal operating rotor speed of the generator, such as a normal super-synchronous speed, before reduction of the rotor generator speed to at or near synchronous speed) and entered into the look-up table to determine the second switching frequency.

Also, the second switching frequency may be determined so that harmonic distortions induced by the power converter and transferred to the load are within a pre-defined limit value.

The present disclosure also encompasses a wind turbine system configured to supply real and reactive power to a load, the system including a wind turbine rotor comprising a hub and a plurality of blades coupled to the hub. A doubly fed induction generator (DFIG) is coupled to the wind turbine rotor and is operable in a range of generator rotor speeds. A power converter is operationally configured with the DFIG and includes a line-side converter (LSC) and a rotor-side converter (RSC), the RSC configured to generate the reactive power. A controller is in communication with the power converter and, as the generator rotor speed changes and approaches synchronous speed, the controller generates a control command to decrease a switching frequency of the switching elements (e.g., insulated gate bipolar transistor (IGBT) elements) in the RSC from a first switching frequency to a second switching frequency to increase the reactive power output of the RSC. The second switching frequency is determined in real operating time of the generator by the controller to provide a defined reactive power value generated by the RSC at a changed generator rotor speed, such as a speed at or near synchronous speed, while maintaining the switching elements within defined thermal limits.

In a particular embodiment of the system, the controller determines the second switching frequency from a look-up table that cross-references reactive power values generated at the second switching frequency for different generator rotor speeds. The look-up table may provide the different generator rotor speeds as a plurality of sub-ranges, wherein for each sub-range a second switching frequency is provided for a particular reactive power value. The look-up table may provide a plurality of different reactive power values and corresponding second switching frequencies for each sub-range of generator rotor speeds.

In one embodiment of the system, the reactive power value required from the RSC at a particular generator rotor speed is pre-defined (e.g., based on known characteristics of the power generation system and known load requirements) and entered into the look-up table to determine the second switching frequency.

In an alternate embodiment of the system, the reactive power value required from the RSC at a particular generator rotor speed is measured in real time (e.g., by measuring the load reactive power or the reactive power supplied by the power generation system at a normal operating rotor speed of the generator, such as a normal super-synchronous speed, before reduction of the rotor generator speed to at or near synchronous speed) and entered into the look-up table to determine the second switching frequency.

The present disclosure further encompasses a power generation system configured to supply real and reactive power to a load, the system including a generator operable at a generator rotor speed. A power converter is coupled to the generator and includes a plurality of switching elements configured to generate the reactive power. A controller in communication with the power converter and, as the generator rotor speed approaches synchronous speed, generates a control command to decrease a switching frequency of the switching elements from a first switching frequency to a second switching frequency to increase the reactive power output of the power converter. The second switching frequency is determined in real time by the controller and is based on providing the defined reactive power value generated by the power converter at a changed generator rotor speed, such as a speed at or near synchronous speed, while maintain the switching elements within defined thermal limits.

It should be understood that the methods and systems may further include any combination of the additional features and/or steps as described herein.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a system and method for operating a power generation system, such as a wind turbine configured with a doubly fed induction generator (DFIG) system. As mentioned, in a particular embodiment of the system and method, the present subject matter is directed to a system and method for operating a power converter of a wind-driven DFIG in a manner that increases reactive power output of the power converter when the generator is operating at or near its synchronous speed while maintaining the switching elements within defined thermal limits and controlling harmonic distortions introduced by the converter. For example, under normal power-generation speeds, a DFIG is typically operated at super-synchronous speeds. However, during specific operating modes (e.g., during a noise-reduced operating mode of the wind turbine system), the generator may be operated at speeds at or near its synchronous speed where reactive power capability of the power converter is limited by the thermal cycling constraints of the switching elements (e.g., the IGBTs). In such instances, the present method and system propose to increase the reactive power output of the power converter by reducing the switching frequency of the switching elements to a frequency that is determined in real time by the controller and is based on providing pre-defined reactive power values from the power converter at different generator rotor speeds The reduced switching frequency is also based on maintaining the switching elements within defined thermal limit (e.g., below a defined delta temperature value during thermal cycling of the devices).

Although not limited to such configurations, for sake of explanation, the present method and system aspects of the invention are described herein with reference to a wind turbine power generating system, and more particularly to a wind turbine DFIG system that supplies real and reactive power to a grid.

Figure 1:
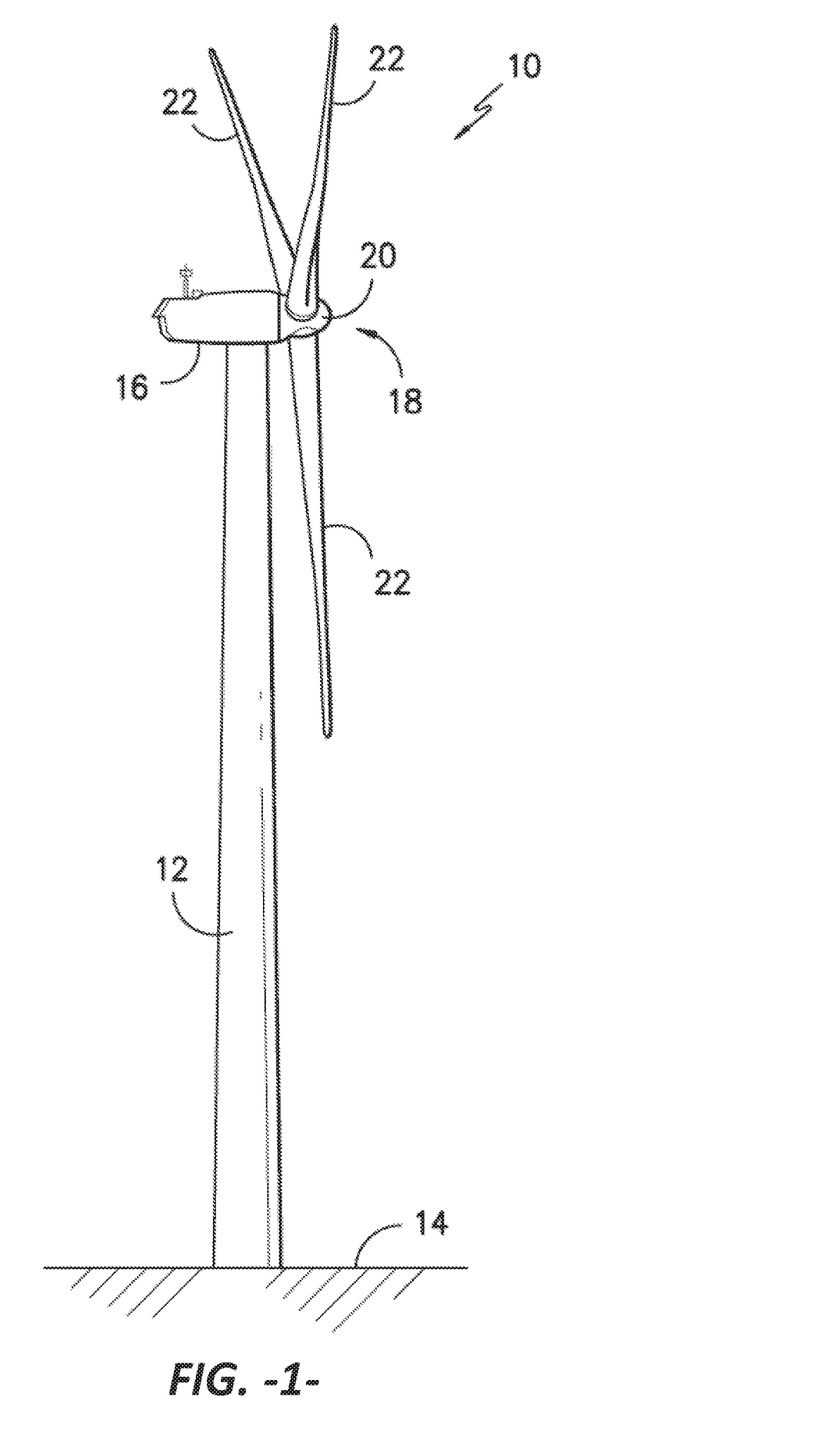
FIG. 1 illustrates a perspective view of an embodiment of a wind turbine according to the present disclosure.

Referring now to the drawings, FIG. 1 illustrates a perspective view of one embodiment of a wind turbine 10. As shown, the wind turbine 10 generally includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, as will be described below, the rotor 18 may be rotatably coupled to an electric generator 120 (FIG. 2) to permit electrical energy to be produced.

Wind power generation is typically provided by a wind farm having a large number (often 100 or more) of the wind turbines, wherein each individual wind turbine 10 typically experiences a unique wind force. Accordingly, the output power for each individual wind turbine generator 120 may vary from one wind turbine 10 to another wind turbine 10 within the wind farm.

As is generally understood, active power (P) and reactive power (Q) are provided by each wind turbine generator 120. In some embodiments, a farm-level controller provides reactive power commands to the wind turbine generators 120, based on transmission grid needs (which may be dictated by the grid operator or determined based on grid voltage). The (Q) demand may be identical for each wind turbine generator. In an alternate control methodology, the reactive power commands may be individually tailored to the wind turbine generators 120 in the wind farm based on the different power generation characteristics of the respective wind turbine generators 120, as described, for example in US Pat. Pub. No. 2015/0295529. It should be appreciated that the present invention is not limited to the manner or methodology in which the reactive power command for an individual wind turbine generator 120 is generated.

Figure 2:
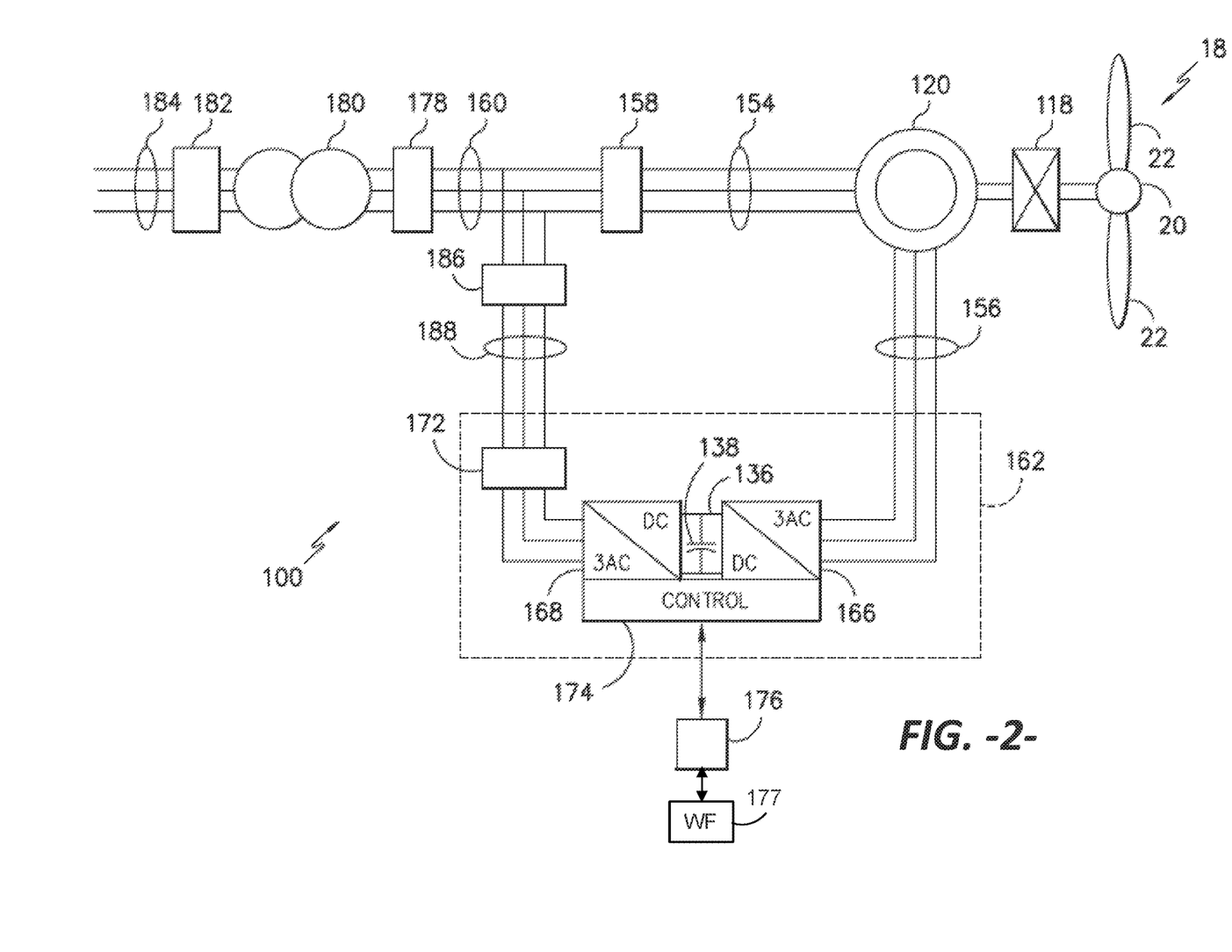
FIG. 2 illustrates a schematic view of one embodiment of a wind turbine electrical power system suitable for use with the wind turbine shown in FIG. 1.

Referring now to FIG. 2, a schematic diagram of one embodiment of a wind turbine DFIG power system 100 is illustrated in accordance with aspects of the present subject matter. Although the present subject matter will generally be described herein with reference to the system 100 shown in FIG. 2, those of ordinary skill in the art, using the disclosures provided herein, should understand that aspects of the present disclosure may also be applicable in other power generation systems, and that the invention is not limited to wind turbine systems.

In the embodiment of FIG. 2, the rotor 18 of the wind turbine 10 (FIG. 1) may, optionally, be coupled to a gear box 118, which is, in turn, coupled to the generator 120, which may be a doubly fed induction generator (DFIG).

As shown, the DFIG 120 is connected to a stator bus 154. A power converter is connected to the DFIG 120 via a rotor bus 156, and to the stator bus 154 via a line side bus 188. The stator bus 154 provides an output multiphase power (e.g. three-phase power) from a stator of the DFIG 120, and the rotor bus 156 provides an output multiphase power (e.g. three-phase power) from a rotor of the DFIG 120. The power converter 162 includes a rotor side converter (RSC) 166 and a line side converter (LSC) 168. The DFIG 120 is coupled via the rotor bus 156 to the rotor side converter 166. Additionally, the RSC 166 is coupled to the LSC 168 via a DC link 136 across which is a DC link capacitor 138. The LSC 168 is, in turn, coupled to a line side bus 188.

The RSC 166 and the LSC 168 may be configured for normal operating mode in a three-phase, pulse width modulation (PWM) arrangement using insulated gate bipolar transistor (IGBT) switching elements, as will be discussed in more detail with respect to FIG. 3.

In addition, the power converter 162 is coupled to a converter controller 174 in order to control the operation of the rotor side converter 166 and the line side converter 168. It should be noted that the controller 174 may, in several embodiments, be configured as an interface between the power converter 162 and a local controller 176 and include any number of control devices. In one embodiment, the converter controller 174 may include a processing device (e.g. microprocessor, microcontroller, etc.) executing computer-readable instructions stored in a computer-readable medium. The instructions when executed by the processing device may cause the processing device to perform operations, including providing control commands (e.g. switching frequency commands) to the switching elements of the power converter 162.

It should be appreciated that the converter controller 174 and the local wind turbine controllers 176 may each correspond to any suitable computing device and/or any combination of computing devices. For instance, a controller may include one or more processor(s) and associated memory device(s) configured to perform a variety of computer-implemented functions. As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) may generally be configured to store suitable computer-readable instructions that, when implemented by the processor(s), configure the controller to perform various functions, such as the steps disclosed herein.

As mentioned, for an individual DFIG wind turbine power system 100, the reactive power (Q) is supplied primarily by the RSC, via the generator 120 and the LSC.

In typical configurations, various line contactors and circuit breakers including, for example, a grid breaker 182 may also be included for isolating the various components as necessary for normal operation of the DFIG 120 during connection to and disconnection from a load, such as the electrical grid 184. For example, a system circuit breaker 178 may couple the system bus 160 to a transformer 180, which may be coupled to the electrical grid 184 via the grid breaker 182. In alternative embodiments, fuses may replace some or all of the circuit breakers.

In operation, alternating current power generated at the DFIG 120 by rotating the rotor 18 is provided to the electrical grid 184 via dual paths defined by the stator bus 154 and the rotor bus 156. On the rotor bus side 156, sinusoidal multi-phase (e.g. three-phase) alternating current (AC) power is provided to the power converter 162. The rotor side power converter 166 converts the AC power provided from the rotor bus 156 into direct current (DC) power and provides the DC power to the DC link 136. As is generally understood, switching elements (e.g. IGBTs) used in the bridge circuits of the rotor side power converter 166 may be modulated to convert the AC power provided from the rotor bus 156 into DC power suitable for the DC link 136.

In addition, the line side converter 168 converts the DC power on the DC link 136 into AC output power suitable for the electrical grid 184. In particular, switching elements (e.g. IGBTs) used in bridge circuits of the line side power converter 168 can be modulated to convert the DC power on the DC link 136 into AC power on the line side bus 188. The AC power from the power converter 162 can be combined with the power from the stator of DFIG 120 to provide multi-phase power (e.g. three-phase power) having a frequency maintained substantially at the frequency of the electrical grid 184 (e.g. 50 Hz or 60 Hz).

Additionally, various circuit breakers and switches, such as grid breaker 182, system breaker 178, stator sync switch 158, converter breaker 186, and line contactor 172 may be included in the wind turbine power system 100 to connect or disconnect corresponding buses, for example, when current flow is excessive and may damage components of the wind turbine power system 100 or for other operational considerations. Additional protection components may also be included in the wind turbine power system 100.

Moreover, the power converter 162 may receive control signals from the local controller 176 via the converter controller 174. The control signals may be based, among other things, on sensed conditions or operating characteristics of the wind turbine power system 100, and provide for control of the operation of the power converter 162. For example, feedback in the form of a sensed speed of the DFIG 120 may be used to control the conversion of the output power from the rotor bus 156 to maintain a proper and balanced multi-phase (e.g. three-phase) power supply. In particular, as will be described below, the sensed speed may be used as a basis for adjusting the switching frequency of the switching elements (e.g., when the DIFG 120 is operating at or near its synchronous speed). Other feedback from other sensors may also be used by the controller 174 to control the power converter 162, including, for example, stator and rotor bus voltages and current feedbacks. Using the various forms of feedback information, switching control signals (e.g. gate timing commands for IGBTs), stator synchronizing control signals, and circuit breaker signals may be generated.

The power converter 162 also compensates or adjusts the frequency of the three-phase power from the rotor for changes, for example, in the wind speed at hub 20 and blades 22. Therefore, mechanical and electrical rotor frequencies are decoupled and the electrical stator and rotor frequency matching is facilitated substantially independently of the mechanical rotor speed.

Under some conditions, the bi-directional characteristics of the power converter 162, and specifically, the bi-directional characteristics of the LSC 168 and RSC 166, facilitate feeding back at least some of the generated electrical power into generator rotor. More specifically, electrical power is transmitted from the stator bus 154 to line side bus 188 and subsequently through the line contactor 172 and into the power converter 162, specifically the LSC 168 which acts as a rectifier and rectifies the sinusoidal, three-phase AC power to DC power. The DC power is transmitted into DC link 136. Capacitor 138 facilitates mitigating DC link voltage amplitude variations by facilitating mitigation of a DC ripple sometimes associated with three-phase AC rectification.

The DC power is subsequently transmitted to the RSC 166 that converts the DC electrical power to a three-phase, sinusoidal AC electrical power with pre-determined voltages, currents, and frequencies. This conversion is monitored and controlled via controller 174. The converted AC power is transmitted from RSC 166 via rotor bus 156 to the generator rotor. In this manner, generator reactive power control is facilitated by controlling rotor current and voltage.

Figure 3:
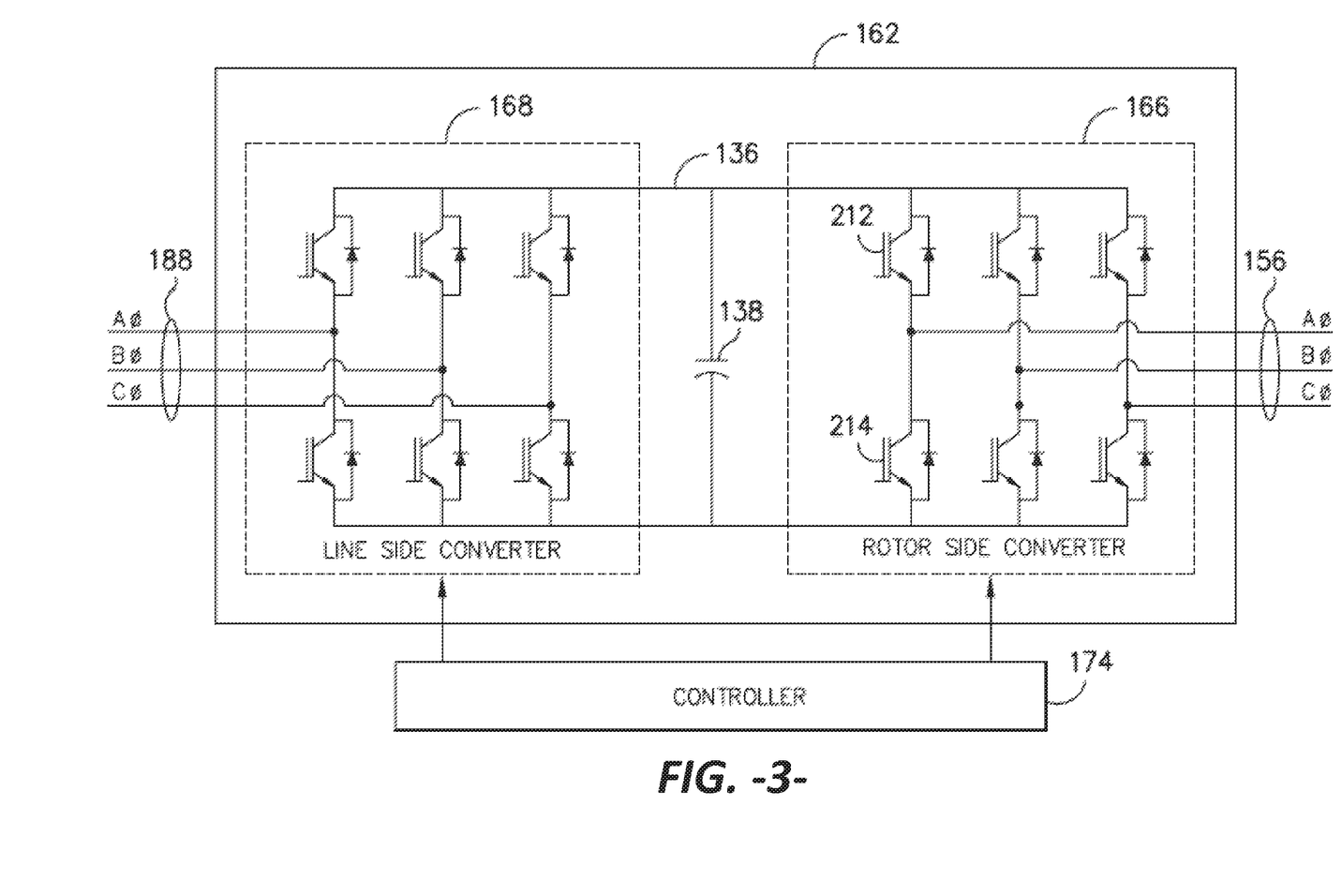
FIG. 3 is a schematic diagram of one embodiment of a power converter of a wind turbine according to the present disclosure.

Referring now to FIG. 3, a schematic diagram of one embodiment of the power converter shown in FIG. 2 is illustrated in accordance with aspects of the present subject matter. As shown, the rotor side converter (RSC) 166 includes a plurality of bridge circuits (e.g. H-bridge circuits), with each phase of the rotor bus 156 input to the rotor side converter 166 being coupled to a single bridge circuit. In addition, the line side converter (LSC) 168 may also include a plurality of bridge circuits. Similar to the rotor side converter 166, the line side converter 168 also includes a single bridge circuit for each output phase of the line converter 168. In other embodiments, the line side converter 168, the rotor side converter 166, or both the line side converter 168 and the rotor side converter 166 may include parallel bridge circuits without deviating from the scope of the present disclosure.

Each bridge circuit may generally include a plurality of switching elements (e.g. IGBTs) coupled in series with one another. For instance, as shown in FIG. 3, each bridge circuit includes an upper IGBT (e.g. IGBT 212) and a lower IGBT (e.g. IGBT 214). In addition, a diode may be coupled in parallel with each of the IGBTs. In alternative embodiments, parallel IGBTs and diodes may be used to increase the current rating of the converter. As is generally understood, the line side converter 168 and the rotor side converter 166 may be controlled, for instance, by providing control commands, using a suitable driver circuit, to the gates of the IGBTs. For example, the controller 174 may provide suitable gate timing commands to the gates of the IGBTs of the bridge circuits. The control commands may control the switching frequency of the IGBTs to provide a desired output. It should be appreciated by those of ordinary skill in the art that, as an alternative to IGBTs, the power convertor 162 may include any other suitable switching elements.

Referring to FIG. 3, each IGBT 212 includes a power diode, wherein the IGBT and power diode are joined to positive or negative DC lines and output lines output three-phase voltages. Changes to the output current of the IGBTs 212, used to produce a three-phase output current waveform at the output lines, can result in power losses, resulting in a higher junction temperature at the IGBTs 212. Such junction temperatures may result in mechanical strain and/or deformation of the bond wires, thereby shortening the lifespan of the converters 166, 168.

It is recognized that the junction thermal cycle temperature difference (ΔT) generated in cycling of the IGBTs from ON to OFF significantly affects the number of cycles that the device can sustain, and thus the life of the IGBT. For example, a reduction in a temperature change (ΔT) by approximately 10° C. may improve the semiconductor life by a factor of two. Changing the ΔT from 10° C. to 30° C. may improve the life from under 100,000 cycles to more than 400,000 cycles. By reducing the switching frequency of the RSC 166, the ΔT is reduced. Thus, the second switching frequency may also be established based on maintaining the junction ΔT below a defined value.

Figure 4:
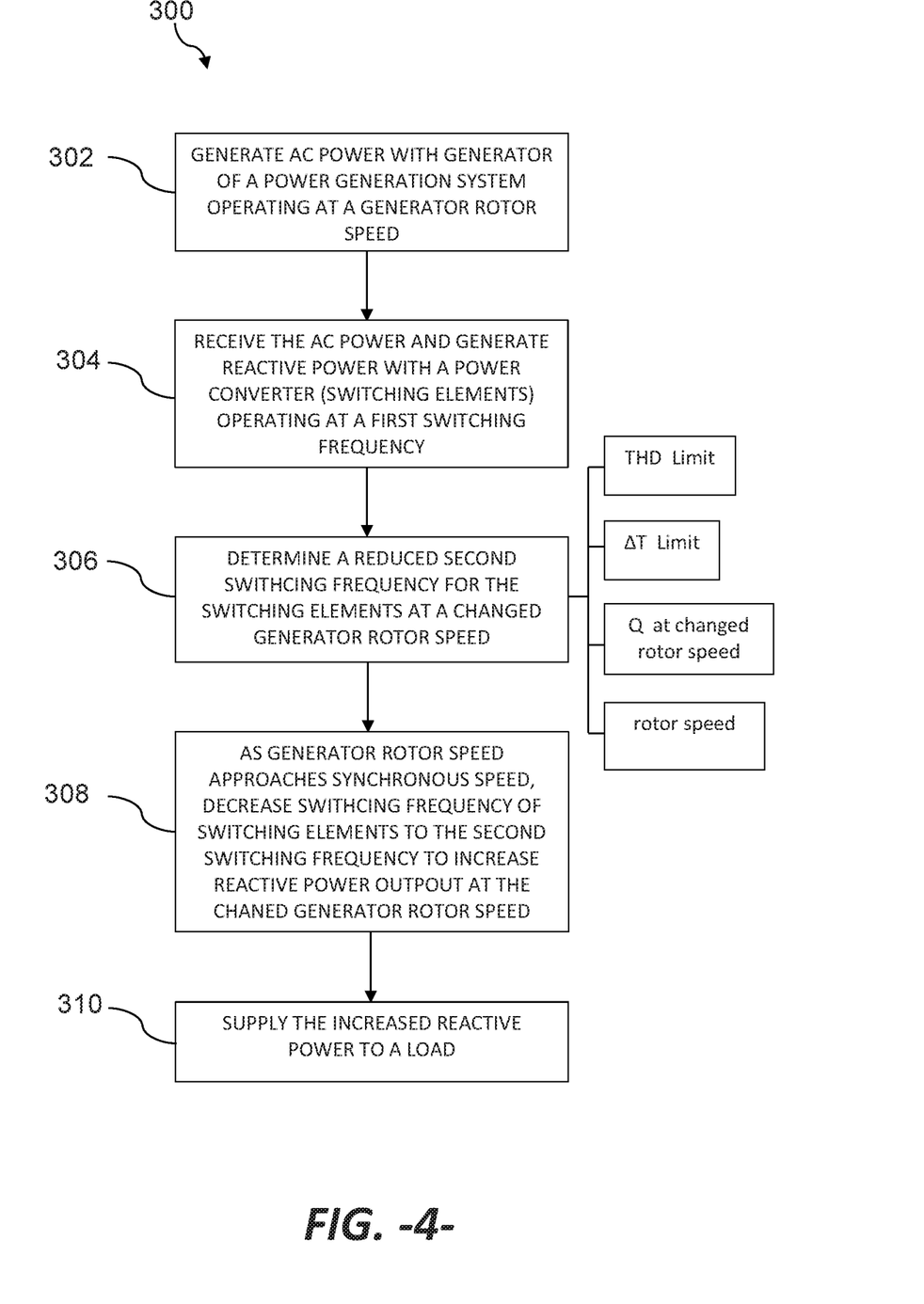
FIG. 4 is a flow diagram of one embodiment of a method for operating the switching devices of a power converter of an electrical power system connected to a power grid or load according to the present disclosure.

Referring now to FIG. 4, a flow diagram of one embodiment of a method 300 for operating a power generation system is illustrated in accordance with aspects of the present subject matter. In general, the method 300 is described herein as implemented using a wind turbine power system, such as the DFIG wind turbine power system 100 described above with reference to FIG. 2. However, it should be appreciated that the disclosed method 300 may be implemented using any other suitable power generation system that is configured to supply power, including reactive power, for application to a load, such as a power grid. In addition, although FIG. 4 depicts steps performed in a particular order for purposes of illustration and discussion, the methods described herein are not limited to any particular order or arrangement. One skilled in the art, using the disclosures provided herein, will appreciate that various steps of the methods can be omitted, rearranged, combined and/or adapted in various ways.

At (302), the method 300 includes generating alternating current (AC) power with a generator of a power generation system, such as a wind turbine power system incorporating a DFIG as discussed above. The AC power may be a multiphase alternating current power, such as a three-phase alternating current power.

At (304), the AC power is received by a power converter via a bus and is converted by the power converter to an output power suitable for application to a load (e.g., to an electrical grid). The output power includes real power (P) and reactive power (Q). The power converter includes a plurality of switching elements, such as IGBTs, wherein pulse width modulation of the switching elements may be controlled at a first switching frequency to provide output power for application to the load at a first operating speed of generator rotor. The first switching frequency on the rotor side converter (RSC) of a DFIG power convertor may be the frequency typically used for all generator rotor speeds within the generator's normal operating speed range (e.g., about 2000 or 3000 Hz). However, as discussed above, while this first (elevated) switching is desirable for most operating speeds, it results in peak temperatures and thermal cycling stresses in the switching elements and limits the reactive power output of the power converter (particularly, the RSC) at or near synchronous speeds of the generator rotor.

At (306), a reduced second switching frequency is determined for the switching elements at a changed generator rotor speed, in particular speeds at or near synchronous speed. The power converter receives a control command to reduce the switching frequency of the switching elements to the second switching frequency from a controller. The second switching frequency is determined in real operating time of the generator based on the changed generator rotor speed and is selected to provide a defined reactive power value from the power converter at the changed generator rotor speeds at or near synchronous speed. The second switching frequency may also be defined based on maintaining the IGBTs below a junction ΔT value. The second switching frequency compensates for the deficiency in reactive power that would otherwise result if the first switching frequency were maintained at the changed generator rotor speeds.

It should be appreciated that the second switching frequency based on the variables of rotor speed, reactive power, and ΔT limit may be determined empirically, via computer modeling, testing of actual systems, and by any other suitable means.

In a certain embodiment, the change (deficiency) in reactive power at the power converter may be measured in real time as the generator rotor speed changes, wherein the switching frequency of the IGBTs is reduced in a feedback control loop until the deficiency of reactive power is compensated for by the second switching frequency.

Figure 5:
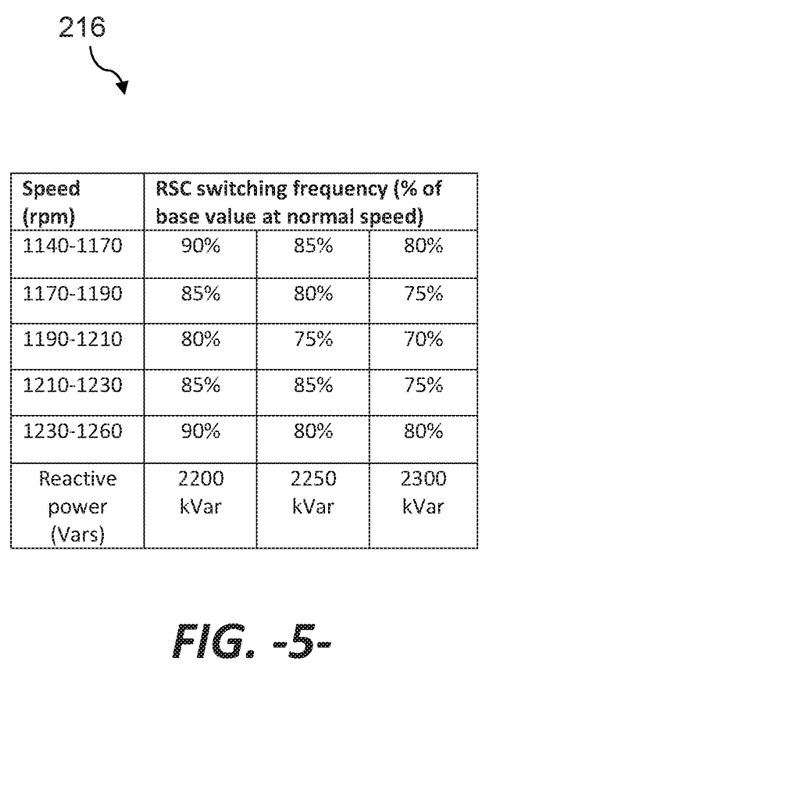
FIG. 5 is an example of a look-up table in accordance with aspects of the present disclosure.

In an alternate embodiment, the second switching frequency may be pre-defined. For example, a controller may determine the second switching frequency from a predefined and stored look-up table 216 (FIG. 5) that cross-references reactive power values generated at the second switching frequency for different generator rotor speeds at or near synchronous speed (in the embodiment of the look-up table 216 depicted in FIG. 5, synchronous speed of the generator rotor is 1200 rpm). Information in the look-up table can be presented in various ways within the scope and spirit of "predefined" values. For example, referring to FIG. 5, the look-up table 216 provides the different generator rotor speeds as a plurality of sub-ranges (e.g., 1140-1170 rpm; 1170-1190 rpm; etc.), wherein for each sub-range a second switching frequency is provided for a particular reactive power value, the second switching frequency also determined to meet the ΔT limit defined for the switching elements. For example, to provide 2250 kVar from the power converter at a generator rotor speed within the sub-range of 1190-1210 rpm, the second switching frequency is 75% of the first switching frequency (base value) at normal operating speeds of the generator rotor (e.g., speeds outside of the "at or near" synchronous speed band). As shown in FIG. 5, the look-up table 216 may provide a plurality of different reactive power values and corresponding second switching frequencies for each sub-range of generator rotor speeds. For example, to provide 2300 kVar from the power converter at the same generator rotor speed within the sub-range of 1190-1210 rpm, the second switching frequency is 70% of the first switching frequency.

The desired reactive power generation value required for production by the power converter at the changed generator rotor speed (e.g., 2200 kVar or 2300 kVar) may be pre-defined based on known characteristics of the power generation system at the first switching frequency and/or the known load (grid) reactive power requirements and entered into the look-up table to determine the second switching frequency. Alternatively, the reactive power output of the power converter may be measured at the first switching frequency and used to enter the look-up table 216 to determine the second switching frequency that will be needed at the changed generator rotor speed.

It certain embodiments, it may also be desired to limit or define the second switching frequencies so that harmonic distortions induced by the power converter and transferred to the grid via the LSC or the generator are within a pre-defined Total Harmonic Distortion (THD) value set for the power generation system.

At (308), a command is generated (e.g., from the controller 174) to reduce the switching frequency to the second switching frequency in order to increase the reactive power output of the power converter. This command may be generated before the generator rotor speed changes, during the speed change, or after the speed change of the generator rotor.

At (310), the increased reactive power output from the power converter at the changed speed of the generator rotor is supplied to the load, which may be an electrical grid. However, in other embodiments, the load may be a motor, resistive load or any other load. It should be appreciated that, while an electrical grid is traditionally a supplier of power, the electrical grid may act as a load for the disclosed wind turbine power system 100.

It should be appreciated that, as indicated above, the "synchronous speed" of a generator generally refers to the speed at which the rotor current is equal to DC current. In addition, it should be appreciated that the operating speed of a generator may be "at or near" its synchronous speed when the operating speed is within +/−10% of the synchronous speed, such as by operating the generator at a speed of within +/−5% of the synchronous speed or at a speed of within +/−2.5% of the synchronous speed and any other subranges therebetween.

Various aspects and embodiments of the present invention are defined by the following numbered clauses:

1. A method for operating a power generation system that supplies real and reactive power to a load, comprising:
    with a power converter having switching elements, receiving alternating current power from a generator and generating the reactive power within an operating range of generator rotor speed;
    as the generator rotor speed changes and approaches synchronous speed, generating a control command to decrease a switching frequency of the switching elements from a first switching frequency to a second switching frequency, wherein the reactive power output of the power converter is increased at the second switching frequency; and
    wherein the second switching frequency is determined in real operating time of the generator based on providing a defined reactive power value from the power converter at the changed generator rotor speed at or near synchronous speed and maintaining the switching elements within defined thermal limits.

2. The method as in clause 1, wherein the power converter comprises a line-side converter (LSC) and a rotor-side converter (RSC), the RSC generating the reactive power.

3. The method as in any preceding clause, wherein the generator is a doubly fed induction generator (DFIG) in a wind turbine power generation system.

4. The method as in any preceding clause, wherein the switching elements comprise insulated gate bipolar transistor (IGBT) elements.

5. The method as in any preceding clause, wherein a controller determines the second switching frequency from a look-up table that cross-references reactive power values generated at the second switching frequency at different generator rotor speeds.

6. The method as in any preceding clause, wherein the look-up table provides the different generator rotor speeds as a plurality of sub-ranges, and for each sub-range a second switching frequency is provided for the reactive power value.

7. The method as in any preceding clause, wherein the look-up table provides a plurality of the reactive power values and a corresponding second switching frequency for each sub range at each of the reactive power values.

8. The method as in any preceding clause, wherein the reactive power value required from the power generation system at a particular generator rotor speed is pre-defined and entered into the look-up table to determine the second switching frequency.

9. The method as in any preceding clause, wherein the reactive power value required from the power generation system at a particular generator rotor speed is measured in real time and entered into the look-up table to determine the second switching frequency.

10. The method as in any preceding clause, wherein the second switching frequency is determined so that harmonic distortions induced by the power converter in the load are within a pre-defined limit value.

11. A wind turbine system configured to supply real and reactive power to a load, comprising:
    a wind turbine rotor comprising a hub and a plurality of blades coupled to the hub;

a doubly fed induction generator (DFIG) coupled to the wind turbine rotor and operable at a generator rotor speed;

a power converter configured with the DFIG and comprising a line-side converter (LSC) and a rotor-side converter (RSC), the RSC comprising a plurality of switching elements configured to generate the reactive power;

a controller in communication with the power converter and, as generator rotor speed changes and approaches synchronous speed, configured to generate a control command to decrease a switching frequency of the switching elements in the RSC from a first switching frequency to a second switching frequency to increase an output of the reactive power from the RSC; and wherein the second switching frequency is determined in real operating time of the generator by the controller to provide a defined reactive power value generated by the RSC at a changed generator rotor speed at or near synchronous speed while maintain the switching elements within defined thermal limits.

12. The wind turbine system as in clause 11, wherein the switching elements comprise insulated gate bipolar transistor (IGBT) elements.

13. The wind turbine system as in any one of clauses 10-12, wherein the controller determines the second switching frequency from a look-up table that cross-references reactive power values generated at the second switching frequency at different generator rotor speeds.

14. The wind turbine system as in any one of clauses 10-13, wherein the look-up table comprises the different generator rotor speeds presented as a plurality of sub-ranges, and for each sub-range a second switching frequency is provided for a particular reactive power value.

15. The wind turbine system as in any one of clauses 10-14, wherein the look-up table comprises a plurality of the reactive power values and corresponding second switching frequencies at the sub-ranges of generator rotor speeds.

16. The wind turbine system as in any one of clauses 10-15, wherein the reactive power value required from the RSC at a particular generator rotor speed is pre-defined and entered into the look-up table to determine the second switching frequency.

17. The wind turbine system as in any one of clauses 10-16, wherein the reactive power value required from the RSC at a particular generator rotor speed is measured in real time and entered into the look-up table to determine the second switching frequency.

18. A power generation system configured to supply real and reactive power to a load, comprising:

a generator operable at a generator rotor speed;

a power converter coupled to the generator and comprising a plurality of switching elements configured to generate the reactive power;

a controller in communication with the power converter and, as the generator rotor speed changes and approaches synchronous speed, configured to generate a control command to decrease a switching frequency of the switching elements from a first switching frequency to a second switching frequency to increase the reactive power output from the power converter; and wherein the second switching frequency is determined in real operating time of the generator by the controller to provide a defined reactive power value generated by the power converter at a changed generator rotor speed at or near synchronous speed while maintain the switching elements within defined thermal limits.

19. The power generation system as in clause 18, wherein the controller determines the second switching frequency from a look-up table that cross-references reactive power values produced at the second switching frequency at different generator rotor speeds.

20. The power generation system as in any one of clauses 18-19, wherein the look-up table comprises the different generator rotor speeds presented as a plurality of sub-ranges, and for each sub-range a second switching frequency is provided for a particular reactive power value, and wherein the look-up table comprises a plurality of the reactive power values and corresponding second switching frequencies at the sub-ranges of generator rotor speeds.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for operating a power generation system that supplies real and reactive power to a load, comprising:

with a power converter having switching elements, receiving alternating current power from a generator and generating the reactive power within an operating range of generator rotor speed;

as the generator rotor speed changes and approaches synchronous speed, generating a control command to decrease a switching frequency of the switching elements from a first switching frequency to a second switching frequency, wherein the reactive power output of the power converter is increased at the second switching frequency; and wherein the second switching frequency is determined in real operating time of the generator based on providing a defined reactive power value from the power converter at the changed generator rotor speed at or near synchronous speed and maintaining the switching elements within defined thermal limits.

2. The method as in claim 1, wherein the power converter comprises a line-side converter (LSC) and a rotor-side converter (RSC), the RSC generating the reactive power.

3. The method as in claim 2, wherein the generator is a doubly fed induction generator (DFIG) in a wind turbine power generation system.

4. The method as in claim 2, wherein the switching elements comprise insulated gate bipolar transistor (IGBT) elements.

5. The method as in claim 1, wherein a controller determines the second switching frequency from a look-up table that cross-references reactive power values generated at the second switching frequency at different generator rotor speeds.

6. The method as in claim 5, wherein the look-up table provides the different generator rotor speeds as a plurality of sub-ranges, and for each sub-range a second switching frequency is provided for the reactive power value.

7. The method as in claim 6, wherein the look-up table provides a plurality of the reactive power values and a corresponding second switching frequency for each sub range at each of the reactive power values.

8. The method as in claim 5, wherein the reactive power value required from the power generation system at a particular generator rotor speed is pre-defined and entered into the look-up table to determine the second switching frequency.

9. The method as in claim 5, wherein the reactive power value required from the power generation system at a particular generator rotor speed is measured in real time and entered into the look-up table to determine the second switching frequency.

10. The method as in claim 1, wherein the second switching frequency is determined so that harmonic distortions induced by the power converter in the load are within a pre-defined limit value.

11. A wind turbine system configured to supply real and reactive power to a load, comprising:
   a wind turbine rotor comprising a hub and a plurality of blades coupled to the hub;
   a doubly fed induction generator (DFIG) coupled to the wind turbine rotor and operable at a generator rotor speed;
   a power converter configured with the DFIG and comprising a line-side converter (LSC) and a rotor-side converter (RSC), the RSC comprising a plurality of switching elements configured to generate the reactive power;
   a controller in communication with the power converter and, as generator rotor speed changes and approaches synchronous speed, configured to generate a control command to decrease a switching frequency of the switching elements in the RSC from a first switching frequency to a second switching frequency to increase an output of the reactive power from the RSC; and
   wherein the second switching frequency is determined in real operating time of the generator by the controller to provide a defined reactive power value generated by the RSC at a changed generator rotor speed at or near synchronous speed while maintain the switching elements within defined thermal limits.

12. The wind turbine system as in claim 11, wherein the switching elements comprise insulated gate bipolar transistor (IGBT) elements.

13. The wind turbine system as in claim 11, wherein the controller determines the second switching frequency from a look-up table that cross-references reactive power values generated at the second switching frequency at different generator rotor speeds.

14. The wind turbine system as in claim 13, wherein the look-up table comprises the different generator rotor speeds presented as a plurality of sub-ranges, and for each sub-range a second switching frequency is provided for a particular reactive power value.

15. The wind turbine system as in claim 14, wherein the look-up table comprises a plurality of the reactive power values and corresponding second switching frequencies at the sub-ranges of generator rotor speeds.

16. The wind turbine system as in claim 14, wherein the reactive power value required from the RSC at a particular generator rotor speed is pre-defined and entered into the look-up table to determine the second switching frequency.

17. The wind turbine system as in claim 14, wherein the reactive power value required from the RSC at a particular generator rotor speed is measured in real time and entered into the look-up table to determine the second switching frequency.

18. A power generation system configured to supply real and reactive power to a load, comprising:
   a generator operable at a generator rotor speed;
   a power converter coupled to the generator and comprising a plurality of switching elements configured to generate the reactive power;
   a controller in communication with the power converter and, as the generator rotor speed changes and approaches synchronous speed, configured to generate a control command to decrease a switching frequency of the switching elements from a first switching frequency to a second switching frequency to increase the reactive power output from the power converter; and
   wherein the second switching frequency is determined in real operating time of the generator by the controller to provide a defined reactive power value generated by the power converter at a changed generator rotor speed at or near synchronous speed while maintain the switching elements within defined thermal limits.

19. The power generation system as in claim 18, wherein the controller determines the second switching frequency from a look-up table that cross-references reactive power values produced at the second switching frequency at different generator rotor speeds.

20. The power generation system as in claim 19, wherein the look-up table comprises the different generator rotor speeds presented as a plurality of sub-ranges, and for each sub-range a second switching frequency is provided for a particular reactive power value, and wherein the look-up table comprises a plurality of the reactive power values and corresponding second switching frequencies at the sub-ranges of generator rotor speeds.

* * * * *